Oct. 14, 1958 D. E. HELSEL 2,856,218
RANGE POLE JOINT
Filed May 17, 1954
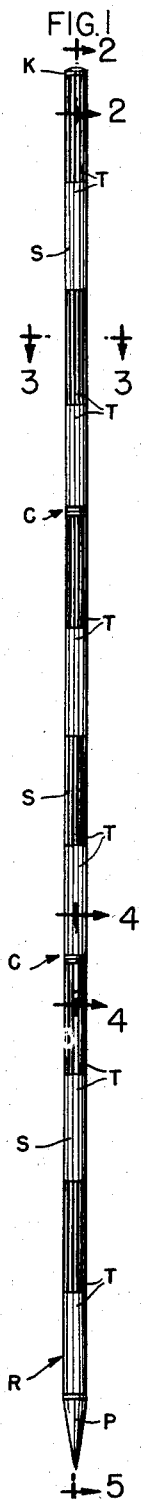
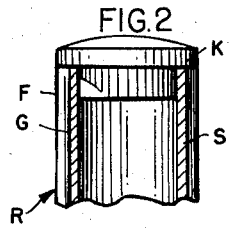
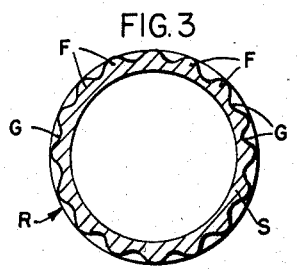
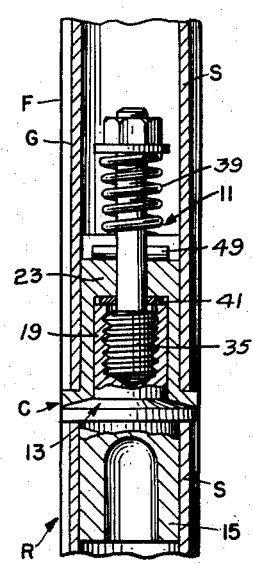
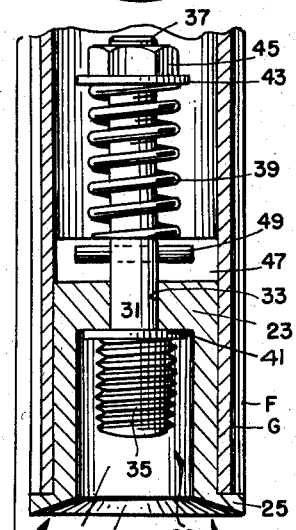
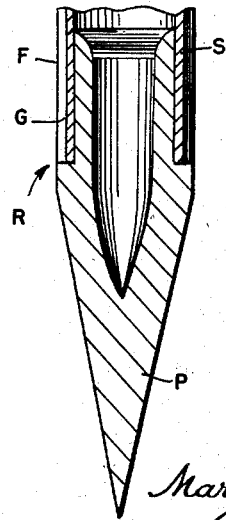
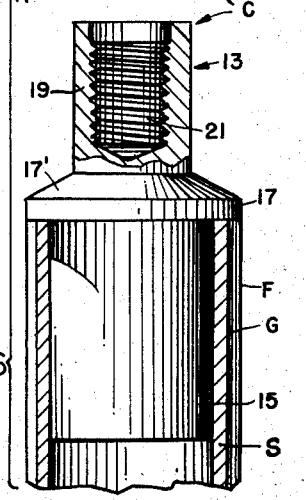
INVENTOR:—
DOLPH E. HELSEL
BY:—
Marzall, Johnston, Cook & Root
ATTORNEYS

United States Patent Office 2,856,218
Patented Oct. 14, 1958

2,856,218
RANGE POLE JOINT

Dolph E. Helsel, Berwyn, Ill., assignor to Eugene Dietzgen Co., Chicago, Ill., a corporation of Delaware Application May 17, 1954, Serial No. 430,051

5 Claims. (Cl. 287—125)

The present invention relates in general to collapsible rods or poles, and has more particular reference to an improved joint structure for detachably coupling rod sections together, the invention pertaining especially to a joint structure particularly well adapted for interconnecting the sections of knock-down surveying range poles.

An important object of the invention is to provide an improved joint structure for detachably connecting rod sections firmly and rigidly together in end-to-end coaxial alignment; a further object being to provide a rod joint that is operable quickly and easily to effect a firm and rigid connection between detachable rod sections.

Another important object is to provide a joint structure embodying cooperating screw-threaded elements formed and arranged on rod sections to be joined in manner enclosing the threaded portions of the structure to protect the same against injury through accidental impact when the connectible parts are in uncoupled condition.

Another important object is to provide a screw-threaded coupling structure for sectional rods embodying means for latching the same in coupled relationship; a further object being to provide for the frictional latching of interfitting screw-threaded parts in coupled relationship to yieldingly resist relative movement of the threaded parts in a direction to uncouple the same.

Another important object is to provide a structure for coupling a pair of rod sections comprising means forming a socket in an end of one of the rod sections and sized to snugly receive a corresponding projection formed on the end of the other rod section whereby to precisely align the rod sections in response to the insertion of said projection in said socket; a further object being to form cooperating, preferably slightly conical seats on said sections, in position encircling said projection and its corresponding cavity, whereby to limit the insertion of the projection in the cavity; a still further object being to provide a screw threaded stem on one of said sections and disposed in position for threaded engagement in an internally threaded cavity formed in the other of said sections; yet a further object being to yieldingly support one of said threaded elements on its associated rod sections as by means of a resilient mounting spring whereby to impart resilient latching tension on said element and thus yeldingly to latch said threaded elements in fully coupled relationship.

Another important object is to provide a rod structure comprising separable sections and cooperating coupling means formed on the ends of the sections to be joined, said cooperating means comprising a fitting forming a socket adapted to be secured upon the end of one rod section and a fitting adapted for attachment on the end of another rod section to provide thereon a projection conformed with and adapted to snugly fit within said socket; a further object being to provide a rod structure comprising tubular sections having cooperating joint forming means secured in the ends of said tubular sections; a still further object being to provide collapsible rods comprising tubular sections of lightweight metal such as aluminum.

Another important object is to form the rod sections externally with flutes or ribs extending longitudinally to maintain maximum strength in sections of minimum weight, and also to aid in preserving, on the surface portions of the section, between said ribs, a colored coating applied to the outer surfaces of the rod.

Another object is to provide a tubular rod of lightweight material such as aluminum having longitudinally extending external ribs or flutes for obtaining maximum resistance to lateral bending of the rod in a structure of minimum weight.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Figure 1 is a side view of a range pole embodying the present invention;

Figures 2, 3, 4 and 5 are enlarged sectional views taken substantially along the lines 2—2, 3—3, 4—4 and 5—5 in Figure 1; and Figure 6 is a sectional view similar to Figure 4 showing the parts in relatively uncoupled relationship.

To illustrate the invention, the drawings show a collapsible pole structure R comprising tubular sections S held detachably together by coupling means C whereby the several sections may be secured together in coaxial end-to-end alignment to form a rigid rod-like device, the coupling means being readily operable to permit the several sections to be quickly disjointed.

It will be apparent, of course, that the present invention is not necessarily limited or restricted to the particular use to which sectional rod-like structures embodying the invention may be put; in fact, the present invention contemplates the possibility of applying the features thereof in many different types of sectional rod or pole structures. For the purpose of demonstrating the invention, however, the drawings show a surveying range pole wherein the sections S are of length suitable for convenient storage and porterage, such length being a preferably even multiple of a smaller unit of linear measure, whereby successive unit length portions of the rod section may be alternately coated with pigment of contrasting color. Where rod sections S are thus marked, it will be seen that a pole comprising a plurality of such marked sections may comprise alternately colored segments T of unit length extending from one end of the pole to the other.

Each pole section S of the rod structure R preferably comprises a tubular element of lightweight material such as aluminum, the several sections being preferably of identical length, sectional shape and diametral size. Where the sectional rod structure is manufactured for surveying range pole purposes, the peripheral surfaces of the sections S may be, and preferably are, formed with equally spaced-apart longitudinally extending flutes $f$ and intervening grooves G extending between the opposite ends of each pole section S. This ribbed construction not only affords maximum strength and rigidity against lateral bending in a pole structure of minimum weight, but also renders the pigment coated sections highly resistant to deterioration of the coating under abusive treatment of the sort frequently given range poles in service. In this connection, the outermost edges of the flutes F will accept substantially all impact that may be applied to the pole sections during their service life; and while the pigment coating may be knocked, scraped or otherwise detached from such the outermost edges, as a result of contact with external objects, the pigment which covers the pole surfaces defining the grooves G and the sides of the flutes will remain undisturbed in situ throughout the service life of the device.

As shown, the pole R may comprise a top, a bottom and an intermediate section. Although the invention includes a two piece pole structure embodying a top and bottom section only, as well as multiple section structures comprising a plurality of intermediate sections in addition to the top and bottom sections. The top section may carry a cover cap K having a head covering the upper end of the section and a mounting shank or stem preferably sized for tight press-fitted engagement in the end of the tubular section. The bottom section also may carry a pole point P, preferably of hard metal such as tempered steel, having a mounting shank preferably sized for tight press-fitted engagement in the lower end of the tubular section. If desired, the mounting shanks of the cap K and of the pole point P may be welded to the top and bottom pole sections or secured in any other preferred fashion as by means of fastening pins extending diametrally through the shanks and pole sections.

The coupling means C preferably comprises a latching structure 11 formed on one end of a rod section and a cooperating keeper structure 13 formed on the end of another section in position such that the structures 11 and 13 may be caused to detachably and interfittingly engage by bringing the section ends on which said structures are mounted or formed into coaxial end-abutting relationship.

As shown, the latching and keeper structures may be formed respectively at the upper end of the botom pole section, and at the lower end of the top pole section, and vice-versa, each intermediate pole section having a latching structure 11 at one end and a keeper structure 13 at the other.

The keeper structure 13 may comprise a fitting having a mounting stem or shank 15 formed for snug engagement within the end of the pole section S on which the element is mounted, an adjacent flange 17 adapted to seatingly engage the end of the pole section, and a preferably cylindrical projection 19, on the side of the flange remote from the mounting portion 15. The projection 19 is supported in position extending in coaxial alignment with the pole section on which the fitting is mounted. The projection is also formed with a coaxial latching socket 21 opening outwardly of its flange remote end.

The latching structure 11 may comprise a body 23 formed for snug engagement within the end of a pole section S, said body having an outwardly extending peripheral flange 25 disposed in position to overlie the end of the section in which it is mounted. The body 23 may be provided with a preferably cylindrical cavity 27 formed in coaxial alignment with the section S in which the body is mounted, said cavity being sized to snugly yet slidingly receive the projection 19 of the keeper structure 13.

The members 15 and 23 may be formed of brass or other suitable material and may be secured to the pole sections, on which the same are mounted, by welding, by tight press fitting or by means of fastening pins extending radially through the walls of the pole sections and into the members. As a consequence, pole sections S respectively carrying the latching and keeper structures 11 and 13 may be connected in precise axial alignment by applying the projection 19 into the cavity 27.

In order to fasten so aligned sections together, with the projection 19 extending in the cavity 27, the latching structure 11 may be provided with a latching member shiftably mounted on the body 23 in position to engage the keeper 13 at the latching cavity 21. As shown, the latching member 29 may comprise a stem 31 extending in an opening 33 formed in body 23, said threaded stem having an enlarged end 35 disposed coaxially within the cavity 27 and provided with external screw threads sized for threaded engagement with corresponding internal screw threads formed upon the walls of the cavity 21.

The stem 31 has an end 37 which projects outwardly of the body 23 and within the pole section upon which said body is mounted, said outwardly projecting end carrying a preferably helical spring 39, in compression thereon, for normally urging the stem axially on the body 23 in a direction to draw the threaded end 35 thereof into yielding engagement with the bottom of the cavity 27, said end 35 providing a shoulder adapted to seat upon a washer 41 mounted on the stem in position to bear upon the bottom of the cavity 27. To thus axially urge the stem 31, one end of the spring 39 may bear upon the enclosed end of the body 23, the opposite end of the spring bearing against an abutment, such as a washer 43 secured on the stem 31, in any preferred fashion, as, for example, by means of a fastening nut 45 threadedly engaging the end 37 of the stem.

It will be seen from the foregoing that pole sections S may be detachably interconnected in coaxial end-abutting alignment by inserting the projection 19 on one section into the cavity 27 of the latching structure on the other section, and by then relatively turning the sections, thereby causing the threaded head 35 to engage within the threaded socket 21. In order to hold the stem 31 against turning movement in the body 23 during the coupling of the threaded elements 21 and 35, the inner end of the body 23 may be provided with a diametral groove 47, and the stem 31 may carry a pin 49 extending diametrally therethrough in position projecting in the groove 47. Sections S may be relatively turned until the projection 19 is completely received within the cavity 27 and the flange 17 becomes seated upon the flange 25, said flanges being preferably formed with matching conical seating surfaces 17' and 25' respectively.

The spring means 39 may serve to resiliently lock the parts together in coupled relationship against accidental loosening of the coupled connection as may easily occur when threadedly interconnected pole sections are roughly or carelessly handled in using or transporting the same. In this connection, it will be noted that the diametral pin 49 is normally spaced from the bottom of the groove 47. As a consequence, the stem 31 may have axial movement with respect to the body 23, within limits determined by the spacement of the pin 49 with respect to the bottom of the groove 47, such axial movement being yieldingly resisted by the spring 39. Accordingly, when the flanges 17 and 25 come into seating engagement as the result of the coupling of the threaded parts 21 and 35, further relative turning movement of the sections being coupled will draw the stem axially in a direction to permit the part 35 to advance further into the cavity 21, the spring 39 yielding to permit such relative axial movement of the stem. The threaded end 35 of the stem may thus be drawn into the cavity 21 a distance limited by the engagement of the pin 49 with the bottom of the groove 47. Preferably, the parts are arranged to permit several turns of one section with respect to the other, after engagement of the flanges 17 and 25, in order to provide for spring-pressed friction locking action, between the threadedly interconnected elements 21 and 35, to firmly secure the parts in coupled relationship.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A pole embodying a pair of sections and fastening means for detachably securing said sections in end abutting relation, comprising means forming a projection at an end of one section, means forming a pocket at an end of the other section for receiving said projection, said projection being formed with a screw threaded socket therein, and a screw threaded stud mounted for axial shifting movement, between limits, on the said other section, in position for threaded engagement with said threaded socket in response to relative turning movement of said sections, and biasing means yieldingly urging said stud axially in one direction on the said other section.

2. A pole embodying a pair of sections and fastening means for detachably securing said sections in end abutting relation, comprising means forming a projection at an end of one section, means forming a pocket at an end of the other section for receiving said projection, said projection being formed with a screw threaded socket therein, and a screw threaded stud mounted for axial shifting movement, between limits, on the said other section, in position for threaded engagement with said threaded socket, spline means for holding the stud against relative rotation on the said other section, and biasing means yieldingly urging said stud axially in one direction on the said other section.

3. A pole embodying a pair of sections and fastening means for detachably securing said sections in end abutting relation, comprising means forming a projection at an end of one section, means forming a pocket at an end of the other section for receiving said projection, said projection being formed with a screw threaded socket therein, and a screw threaded stud mounted for axial shifting movement, between limits, on the said other section, in position for threaded engagement with said threaded socket, spline means for holding the stud against relative rotation on the said other section, and a helical spring connected with and encircling said stud and serving to yieldingly urge the same in one direction axially on said other section.

4. A pole embodying a pair of sections and fastening means for detachably securing said sections in end abutting relation, comprising means forming a projection at an end of one section, means forming a pocket at an end of the other section for receiving said projection, said projection being formed with a screw threaded socket therein, a screw threaded stud mounted on the said other section, within the said pocket, in position for threaded engagement with said threaded socket in response to relative turning movement of said sections, cooperating peripheral shoulders formed on said sections in position for mutual engagement when the sections are connected together, said stud being splined for axial shifting, non-rotative movement with respect to its carrying section, and a spring yieldingly holding the stud in retracted position on its carrying section, to thereby apply the thrust of said spring between the threads of the stud and socket in response to relative turning movement of the pole sections following interengagement of said peripheral shoulders.

5. A pole embodying a pair of sections and fastening means for detachably securing said sections in end abutting relation, comprising means forming peripheral shoulders on the ends of said sections in position for mutual engagement when the sections are interconnected, an externally threaded stud element carried on one of said sections, an internally threaded socket element carried on the other section for detachable connection with said externally threaded stud element, one of said elements being fast on its carrying section, the other element being axially shiftable on and with respect to its carrying section, a spline interconnecting said axially shiftable element with its carrying section, and a spring yieldingly holding said axially shiftable element, on its carrying section, in normally retracted position to threadingly engage the other element to draw said sections together in response to relative rotation thereof, said spring held element being axially shiftable from retracted position on its carrying section in response to continued relative turning movement of the sections following engagement of said shoulders, to thereby apply the thrust of said spring between the threads of the stud and socket in response to relative turning movement of the pole sections following interengagement of said peripheral shoulders.

References Cited in the file of this patent

UNITED STATES PATENTS

| 406,681 | Watts | July 9, 1889 |
| 846,503 | Palmer | Mar. 12, 1907 |
| 1,020,018 | Bonin | Mar. 12, 1912 |
| 1,558,268 | Mast | Oct. 20, 1925 |
| 1,609,772 | Rank | Dec. 7, 1926 |
| 1,705,542 | Ryser | Mar. 19, 1929 |

FOREIGN PATENTS

| 564,528 | Great Britain | Oct. 2, 1944 |